April 6, 1954

A. MASON 2,674,232

LATCHING MECHANISM

Filed May 28, 1952

INVENTOR.
AVREL MASON

BY
Ellsworth R. Royston
ATTORNEY

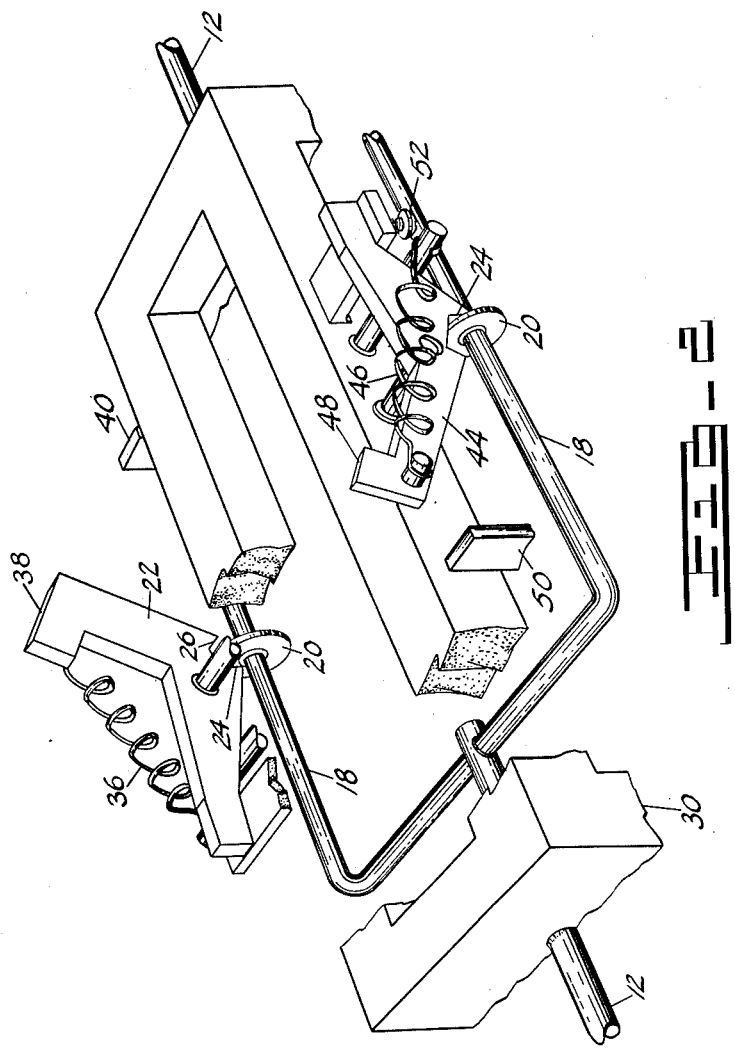

April 6, 1954  A. MASON  2,674,232
LATCHING MECHANISM
Filed May 28, 1952  3 Sheets-Sheet 3

INVENTOR.
AVREL MASON
BY
Ellsworth R. Roston
ATTORNEY

Patented Apr. 6, 1954

2,674,232

UNITED STATES PATENT OFFICE 2,674,232

LATCHING MECHANISM

Avrel Mason, Birmingham, Mich., assignor to Bendix Aviation Corporation, Detroit, Mich., a corporation of Delaware Application May 28, 1952, Serial No. 290,462

15 Claims. (Cl. 121—41)

This invention relates to a system for controlling the movements of an output member in accordance with the movements of an input member. More particularly, the invention relates to apparatus for controlling the movements of input and output members in a positioning system during the periods of system idleness, so that the system will subsequently be in condition to operate properly.

In co-pending application, Serial No. 272,591 filed February 20, 1952, by Abraham M. Fuchs, a system is disclosed for positioning an output member in accordance with the movements of an input member. The system includes a transformer having an armature which is displaced by the input member to generate in the transformer a signal having an amplitude proportional to the displacement. This signal controls the application of a hydraulic force so that the force moves the output member in accordance with the signal amplitude. The output member is in turn coupled to the transformer windings and core for movement of the windings and core in a direction to minimize the signal induced in the transformer. By utilizing such a closed servomechanism loop, extreme accuracies are obtained in the movement of the output member. Because of such accuracies, the system is especially useful in guiding a tool head in accordance with the movements of a master cam.

Since a signal is generated in the transformer only when the armature lies within the transformer core, it is important that the relative displacement between the armature and the core should never exceed a predetermined value. Sometimes, however, the output member may be inadvertently moved by unskilled operators when the tool is shut off, so that the armature is out of the range of satisfactory transformer operation. For example, a janitor sweeping a shop floor may bump into a tool head and displace the head and the transformer windings beyond the limits of transformer operation. If this should occur, the system would not be able to function properly until the tool head and transformer windings were manually adjusted in position to provide for the generation of a control signal by the transformer.

This invention provides apparatus for maintaining the relative movement between the transformer armature and windings within safe limits even though the output member may be unknowingly displaced through an unusually large distance. The apparatus operates to couple the output member to the input member through the transformer when the displacement between the armature and windings of the transformer is within safe limits. As soon as the relative displacement between the armature and windings starts to exceed such safe limits, the apparatus operates to uncouple the output member from the input member. This permits the input member to move independently with respect to the output member until such time as the relative displacement between the armature and core is again within the predetermined value. The apparatus is simple in construction and reliable in operation for all conditions that may be encountered.

An object of this invention is to provide apparatus for operating with a system which accurately positions an output member in accordance with the movements of an input member.

Another object of the invention is to provide apparatus for use in conjunction with the positioning system disclosed above to maintain the system operable at all times.

A further object is to provide apparatus of the above character for maintaining a positioning system operable at all times even when the output member of the system is moved through unusually large distances by unskilled operators.

Still another object is to provide apparatus of the above character for operating in conjunction with a positioning system to maintain the system in readiness for proper operation regardless of any movements that components in the system may undergo during the periods of system idleness.

A still further object is to provide apparatus of the above character for positioning a tool head in accordance with the movements of a master cam and for protecting the tool head against damage from unusual movements that may be inadvertently imposed on the head by unskilled operators.

Other objects and advantages will be apparent from a detailed description of the invention and from the appended drawings and claims.

In the drawings:

Figure 2 is an enlarged perspective view of certain components shown in Figure 1 and illustrates these components in further detail;

Figure 1:
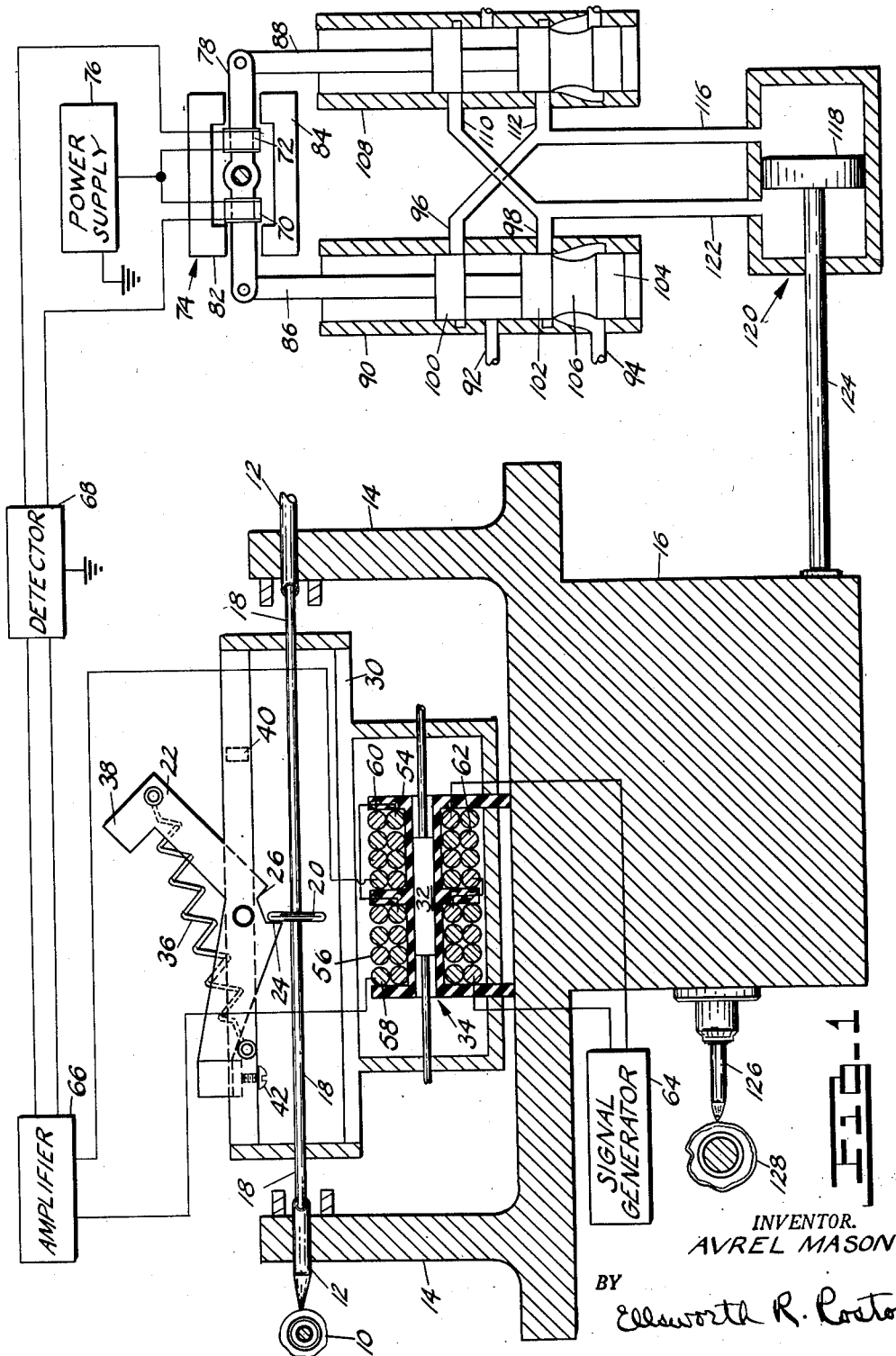
Figure 1 is a schematic diagram, partly in block form and partly in section, illustrating one embodiment of apparatus for positioning an output member in accordance with the movements of an input member.

In one embodiment of the invention, a cam 10 positions an input member such as a drive rod 12 slidably mounted on uprights 14 which extend from an output member, such as a tool head 16. The rod 12 is yoked as at 18 and each leg of the yoke is provided with a disc 20 adapted to normally extend into a cut provided at the intersection of the two legs in a bell crank lever 22. The cut is fairly steep at one side 24 and more shallow at the other side 26, and is integrated by an intermediate portion having a predetermined length, as will be disclosed in detail hereinafter.

The bell crank lever 22 is pivotable at an intermediate position on a housing 30 which supports for movement therewith the armature 32 of a transformer, generally indicated at 34. A spring 36 is fastened at one end to the housing and at the other end to a leg of the bell crank lever 22 at the outer position of the leg. A lug 38 extends from the end of the leg fastened to the spring 36 and, in one position of the lever 22, engages a stop 40 which forms a part of the tool head 16. An adjusting screw 42 extends through a threaded socket in a flange jutting out from the housing 30 and presses against the lever 22 adjacent the position at which the spring 36 is fastened to the housing 30.

In like manner a bell crank lever 44 similar in construction to the lever 22 is disposed on the housing 30 in opposite relationship to the lever 22. The lever 44 is pivotable on the housing 30 at approximately the same position as the lever 22, so that the rod 12 is able to move only a relatively small distance in either direction relative to the levers without tripping one of the levers. A spring 46 is fastened to the lever 44 and the housing 30 in a manner similar to that disclosed above for the spring 36. A lug 48 is provided on the lever 44 for engagement with a stop 50 extending from the tool head 16, and a stud 52 is adjustably supported by the housing 30 for engagement with the lever 44.

The armature 32 of the transformer 34 is made from a suitably magnetic material and is slidable within a non-magnetic core 54 suitably secured to the tool head 16. A primary winding 56 and a secondary winding 58 are interleaved on the left side of the core 54, and a primary winding 60 and a secondary winding 62 are interleaved in a similar manner on the right side of the core. The windings 56 and 58 are similar to the windings 60 and 62 respectively.

The inner terminals of the primary windings 56 and 60 are connected to each other and the outer terminals are connected to a signal generator 64. Connections are made from the inner terminal of the secondary winding 58 to the outer terminal of the secondary winding 62 and from the outer terminal of the winding 58 and the inner terminal of the winding 62 to the input terminals of an amplifier 66. The output from the amplifier 66 is introduced to a detector 68 which has its output applied either directly or through amplifiers (not shown) to the outer terminals of a pair of windings 70 and 72 forming part of a torque motor, generally indicated at 74.

The inner terminals of the windings 70 and 72 are connected to an output terminal of a direct power supply 76. The windings 70 and 72 are disposed on opposite legs of an armature 78 pivotable on a centrally disposed pin. The armature 78 is made from a suitably magnetic material and is separated by relatively small air gaps from oppositely disposed yokes 82 and 84 forming part of a horseshoe magnet (not fully shown). Pistons 86 and 88 are pivotably supported on the outer ends of the armature 78. The piston 86 is slidable in a sleeve 90 having an inlet conduit 92, an outlet conduit 94 and connecting conduits 96 and 98. Spools 100, 102 and 104 are provided on the piston 86 adjacent the conduits 96, 98 and 94 respectively. The spools 102 and 104 are connected by a portion 106 having a curved indentation, as fully disclosed in co-pending application Serial No. 222,591 filed April 24, 1951, by Shih-Hing Lee.

The curved indentation of the connecting portion 106 is provided to compensate for the force opposing the opening of the valve, so that the valve will be operated upon the application of a relatively small torque from the armature 78. The force opposing the opening of the valve is produced between the conduit 96 and the spool 100 as the spool moves away from its position blocking the conduit.

In like manner the piston 88 is provided with spools corresponding to the spools 100, 102 and 104, respectively, and is slidable in a sleeve 108 similar to the sleeve 90. The sleeve 108 is provided with inlet and outlet conduits corresponding to the conduits 92 and 94, respectively, and with connecting conduits 110 and 112 similar to the conduits 96 and 98, respectively. The conduit 96 communicates with the conduit 112 to form a channel 116 leading to the right side of a piston 118 in a ram, generally indicated at 120. Similarly, the conduits 98 and 110 communicate with each other to form a channel 122 leading to the left side of the piston 118. The piston 118 is fastened to a rod 124 adapted to drive an output member such as the head 16 of a tool (not shown). The head 16 carries a cutter 126 for producing on the face of a workpiece 128 a pattern determined by the movements of the head. The head 16 is also coupled to the core 54 and the windings 56, 58, 60 and 62 to produce a displacement of the core and windings.

In its neutral position, the armature 32 is so positioned relative to the secondary windings 58 and 62 that voltages of equal magnitude are induced in the windings by the current flowing through the primary winding from the signal generator 64. Since the voltages induced in the secondary windings have opposite polarities, they are cancelled when introduced to the amplifier 66. When the armature 32 is displaced from its intermediate position, voltages of unequal magnitude and opposite polarity are induced in the windings 58 and 62, and the difference between these voltages is amplified and detected.

For relatively small displacements of the armature 32 to either side of its neutral position, the output voltage produced by the amplifier 66 is substantially proportional to the armature displacement. This results from the symmetrical disposition of the windings 56, 58, 60 and 62 on the non-magnetic core 54. For example, in one model that has been used, the relationship between the output signal and armature displacement is substantially linear for displacements up to 80 mils from either side of the neutral position. In other models, a substantially linear relationship exists for even greater displacements but the deviation from true linearity is slightly greater than in the model disclosed above. The substantially linear portions of the curves of transformer response vs. armature displacement are illustrated at 130 and 132 in Figure 4 for armature displacements to either side of the neutral position.

Figure 4:
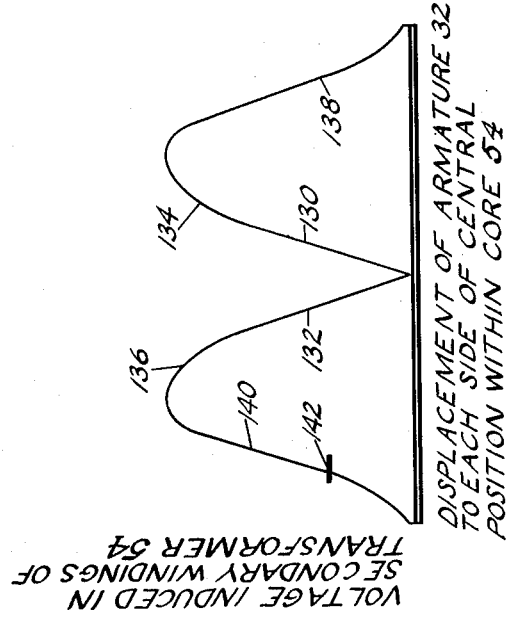
Figure 4 is a diagram of curves illustrating the operation of certain electrical components shown in Figure 1.

As the armature continues to move beyond the region of linear response, its output signal increases for a time at a non-linear rate, as indicated at 134 and 136 in Figure 4. For even greater displacements of the armature 32, the amplitude of the output signal actually starts to decline because the magnetic coupling between the armature and the windings in the transformer is actually starting to decrease. The portions of the response curves illustrating the actual decline of the output signals are illustrated at 138 and 140 in Figure 4. At relatively great displacements of the armature 32 to either side of its neutral position, the amplitude of the output signal generated by the transformer 34 actually declines to zero.

The transformer 34 ordinarily operates in the region of linear response. After being amplified and detected, the output signal is applied as proportionate direct currents to the windings 70 and 72. A positive current flows through one winding from the detector 68, and a negative current of equal magnitude flows through the other winding from the detector. The positive current through the first winding aids the current flowing through the winding from the power supply 76, but the negative current through the other winding opposes the current from the power supply. The resultant unbalance of the currents through the windings causes the armature 78 to be pivoted in a direction and through an angle determined by the unbalance.

When the armature 78 pivots in a clockwise direction, it moves the piston 86 upwardly and the piston 88 downwardly. The upward movement of the piston 86 causes the spools 100 and 102 to move away from their positions blocking the conduits 96 and 98, respectively. As a result, a continuous circuit is established which includes the inlet conduit 92, the connecting conduit 96, the channel 116, the ram 120, the channel 122, the connecting conduit 98 and the outlet conduit 94. The fluid flowing through the continuous circuit acts upon the piston 118 in the ram 120 to move the piston to the left. The rate at which the piston 118 moves at any instant is determined by the distance through which the piston 86 has moved upwardly at that instant, since this distance controls the amount of fluid flowing through the ram 120. Similarly, the piston 118 moves to the right when the armature 78 is pivoted in a counterclockwise direction.

When the piston 118 moves to the left or right in Figure 1, it produces a corresponding movement of the tool head 16 and the cutter 126 so that the cutter cuts the workpiece 128 in a pattern determined by the movements of the cam 10. The tool head 16 also drives the core 54 and the windings of the transformer 34 in a direction to minimize the output signal induced in the transformer. In this way, the movements of the cutter 126 relative to the workpiece 128 are controlled by a closed servomechanism loop which is always operating to reduce to zero any difference between the movements of the armature 32 and the core 54. Because of the closed servomechanism loop, the relative displacement between the armature 32 and the core 54 is always in the order of a mil or less during the cutting operation, even though the cutter 126 may be moving as much as several inches from its neutral position.

As previously disclosed, the output signal from the transformer 34 actually declines to zero if the armature 32 becomes considerably displaced from its neutral position. If the armature should be so displaced, no signal would be produced in the system to move the core 54 and the windings on the core in a direction to restore the armature to an intermediate position within the core. Such a displacement would not occur during the cutting operation on the workpiece 128 except possibly upon a failure of one of the components. However, it might occur during the time that the positioning apparatus is idle if a worker accidentally bumped into the tool head 16.

Upon such a considerable displacement between the armature 32 and the core 54, the tool head 16 would have to be manually moved in order to bring the system within the operating range of the transformer. Once the relative displacement was reduced so that an output in the portion 138 or 140 could be produced in the transformer 34, the transformer would produce a signal upon the operation of the positioning system. This signal would be utilized by the system shown in Figure 1 to reduce the relative displacement between the armature and core so that the transformer would thereafter operate at the beginning of the linear regions 130 and 132.

This invention provides apparatus for maintaining the relative displacement between the armature 32 and the core 54 within the operating range of the transformer at all times. For relative displacements in which an output signal is produced by the transformer, the disc 20 on each leg of the yoke 18 is positioned within the cut in the bell crank lever 22 defined by the walls 24 and 26 and the corresponding cut in the lever 44. This causes the disc 20 to serve as a detent and to operatively engage the levers 22 and 44 for movement of the housing 30 to the right or left in accordance with the movements of the rod 12. Since the armature 34 is supported by the housing 30, the armature is similarly displaced relative to the core 54.

Since the core 54 and the windings on the core are connected to the tool head 16, the displacement between one of the uprights 14 and the housing 30 gradually decreases as the armature 32 moves from its neutral position with respect to the core 54. For example, the housing 30 gradually approaches the left upright 14 in Figure 1 as the armature 32 is displaced to the left. At a displacement between the armature and core corresponding to an output signal illustrated at 142, the housing 30 presses against the left upright 14. If the relative displacement between the armature 32 and the core 54 thereafter increases, the disc 20 exerts an increased force on the bell crank lever 22 and causes the lever to pivot into an alternate position. This alternate position is illustrated in Figure 3 for the lever 22.

Figure 3:
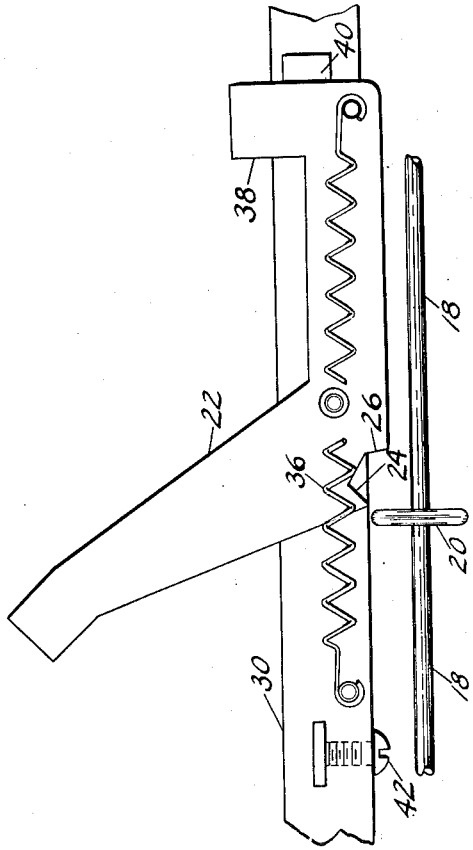
Figure 3 is an enlarged sectional view illustrating an alternate position for certain mechanical components shown in Figures 1 and 2 to maintain the embodiment of Figures 1 and 2 in an operable condition at all times.

When the lever 22 pivots into the position illustrated in Figure 3, it causes the housing 30 and the armature 32 to become operatively uncoupled from the drive rod 12. Because of this uncoupling, any subsequent movements of the rod 12 in a direction to increase the displacement between the armature and the core 54 are not transmitted to the armature. The uncoupling continues until the relative displacement between the armature and the core decreases below the critical distance corresponding to the output signal 142.

Upon such a decrease in displacement, the disc presses against the side 26 of the cut in the lever 22 and causes the lever 22 to pivot back into the position illustrated in Figure 1. The rod 12 then drives the housing 30 and the armature 32 until such time as the critical distance is again reached.

During the time that the bell crank lever 22 is uncoupled from the armature 32, the lug 38 on the bell crank lever engages the stop 40 extending from the tool head 16. This engagement causes the housing 30 to follow any movements of the head 16 when the head moves in a direction tending to increase the displacement between the armature 32 and the core 54. The engagement between the housing 30 and the tool head 16 is broken when the lever 22 pivots back into the position indicated in Figure 1 as a result of a decrease in the displacement between the armature and core below the critical value indicated at 142 in Figure 4.

As previously disclosed, the displacement between the armature 32 and the core 54 is generally not greater than a mil during the operation of the positioning systems. If, however, the tool head should be jarred while the system is operating, the displacement between the armature 32 and the core 54 cannot exceed the critical distance corresponding to the signal 142 because of the operation of the bell crank levers 22 and 44 and their associated components. Since the armature 32 and core 54 are always positioned relative to each other for the production of an output signal, the system operates, after its period of idleness, to quickly reduce the relative displacement to a nominal and normal value. This normal value is at the beginning of one of the linear regions 130 and 132.

Although this invention has been disclosed and illustrated with reference to particular applications, the principles involved are susceptible of numerous other applications which will be apparent to persons skilled in the art. The invention is, therefore to be limited only as indicated by the scope of the appended claims.

What is claimed is:

1. In combination, a motion sensor including first and second members movable relative to each other through a first range from a null position to generate a signal having an amplitude proportional to their relative movement, input means, means for providing a co-operative engagement between the input means and the first member of the motion sensor for relative movements of a predetermined magnitude between the first and second members greater than the first range and less than that in which the motion sensor generates an operable signal, output means having a co-operative engagement with the second member in the motion sensor and operative upon introduction of the generated signal to move in accordance with the movements of the input means, and means operative upon a relative movement of the predetermined magnitude between the first and second members to disengage the means providing a co-operation between the input means and the first member.

2. In combination, a motion sensor including first and second members movable relative to each other through a first range from a null position to generate a signal having an amplitude proportional to their relative movement, input means, latching means adapted to be driven by the input means, means adapted to be driven by the latching means and to drive the first member in the motion sensor in accordance with the movements of the input means, output means connected to the second member in the motion sensor and operative upon introduction of the generated signal to move in accordance with the movements of the input means, and means for disengaging the latching means upon a predetermined relative movement between the first and second members greater than the first range and within the operable limits of the motion sensor to free the first member from movement with the input means.

3. In combination, a motion sensor including first and second members movable relative to each other through a first range from a null position to generate a signal having an amplitude proportional to their relative movement, input means, detent means on the input means to provide a displacement of the first member in the motion sensor, means for engaging the detent means for relative displacements of a predetermined magnitude between the first and second members greater than the first range and within the signal-generating limits of the motion sensor, output means adapted to be displaced in accordance with the signal from the motion sensor and to produce a corresponding displacement of the second member in the sensor in a direction to minimize the signal, and means for disconnecting the engaging means from the detent means upon movements of at least the predetermined magnitude between the first and second members so as to provide a free movement between the input and output means.

4. In combination, a motion sensor including first and second members movable relative to each other through a first range from a null position to generate a signal having an amplitude proportional to their relative displacement, input means, detent means on the input means, means for operatively engaging the detent means for displacements of a predetermined magnitude between the first and second members greater than the first range and within the operable limits of the motion sensor, output means adapted to be displaced in accordance with the amplitude of the generated signal and to move the second member in a direction relative to the first member to minimize the generated signal, means for disconnecting the engaging means from the detent means upon a relative movement of at least the predetermined magnitude between the first and second members, and means for reinstituting the connection between the detent means and the engaging means upon a relative movement between the first and second members to return their relative displacement to within the predetermined limit.

5. In combination, detent means, means for engaging the detent means for movements corresponding to its own movements, input means operative to move the detent means in accordance with its own movement, a motion sensor including first and second members movable relative to each other through a first range from a null position to generate a signal having an amplitude dependent upon their relative displacement, means connected to the first member in the motion sensor and to the engaging means for movement of the first member for displacements of a predetermined value between the first and second members greater than the first range and less than that in which the motion sensor generates an operable signal, output means connected to the second member and adapted to be displaced in accordance with the amplitude of the generated signal, and means for disconnecting the engaging means from the detent means upon a relative displacement of at least the predetermined magnitude between the first and second members.

6. In combination, detent means, means for engaging the detent means for relative movements between them in a first direction of less than a predetermined magnitude, means for disconnecting the engaging means from the detent means for relative movements in the first direction greater than the predetermined magnitude, means for producing an operative relationship between the engaging means and the detent means for movements to bring the relative displacement to a distance within the predetermined magnitude, input means adapted to produce a movement of the detent means, a motion sensor including first and second members movable relative to each other to produce a signal having an amplitude dependent upon their relative displacement, the first member being connected to the engaging means to be responsive to variations in the movements of the input means for relative displacements between the engaging and detent means of less than the predetermined magnitude, and output means connected to the second member in the motion sensor and adapted during operation to be moved in accordance with the amplitude of the generated signal and to move the second member in a direction to minimize the signal.

7. In combination, a motion sensor including first and second members movable relative to each other through a first range from a null position to generate a signal having an amplitude proportional to the relative displacement, input means, a bell crank lever pivotable upon the application of pressure, a housing operative to carry the bell crank lever and to move the first member in the motion sensor, means for moving the bell crank lever in accordance with the movements of the input means, output means adapted to be displaced in accordance with the amplitude of the generated signal and to produce a corresponding displacement of the second member in the motion sensor in a direction to minimize the signal, means on the output means for applying a pressure upon the housing upon a predetermined relative movement between the first and second members in the motion sensor greater than the first range and within the operable limits of the motion sensor so as to pivot the bell crank lever into its inoperative position, and means in the bell crank lever adapted to produce a pivotal movement of the lever into its operative position upon a reduction in the displacement between the first and second members in the motion sensor to less than the predetermined value.

8. In combination, a motion sensor including first and second members movable relative to each other through a first range from a null position to generate an electrical signal having an amplitude dependent upon the relative displacement, input means, a bell crank lever, means on the input means for operatively engaging the bell crank lever for movement of the lever with the input means for displacements of a predetermined magnitude between the first and second members in the motion sensor greater than the first range and within the operable limits of the motion sensor, means for supporting the first member in the motion sensor and for pivotably supporting the bell crank lever so as to provide a movement of the member with the lever in the operative position of the lever, output means adapted to support the second member in the sensor and to move the second member in accordance with the amplitude of the electrical signal and in a direction to reduce the signal amplitude, and means on the output means for engaging the supporting means after a predetermined movement between them to produce a pivotal movement of the bell crank lever so as to disengage the input means for free movement relative to the first member in the sensor.

9. In combination, a motion sensor including first and second members movable relative to each other through a first range from a null position to generate an electrical signal having an amplitude dependent upon the relative displacement, input means, a bell crank lever, means on the input means for operatively engaging the bell crank lever for movement of the lever with the input means for displacements of a predetermined magnitude between the first and second members in the motion sensor greater than the first range and within the operable limits of the motion sensor, means for supporting the first member in the motion sensor and for pivotably supporting the bell crank lever so as to provide a movement of the member with the lever in the operative position of the lever, output means adapted to support the second member in the sensor and to move the second member in accordance with the amplitude of the electrical signal and in a direction to reduce the signal amplitude, means on the output means for engaging the supporting means after a predetermined movement between them to produce a pivotal movement of the bell crank lever so as to disengage the input means for free movement relative to the first member in the sensor, and means in the bell crank lever for producing a pivotal movement of the lever upon a lack of engagement between the output means and the supporting means so as to produce a movement of the first member with the input means.

10. In combination, input means, output means movable relative to the input means, means including a motion sensor for providing a cooperative coupling between the input and output means for relative movements of less than a predetermined magnitude between the input and output means to move the output means in the direction of the input means, means operative upon a relative displacement between the input and output means of the predetermined magnitude to disengage the coupling means from the input means for a free movement of the output means relative to the input means, and means operative upon a reduction of the relative displacement between the input and output means to within the predetermined magnitude to re-engage the coupling means and the input means.

11. In combination, a motion sensor including first and second members movable relative to each other within predetermined limits to generate an operable signal, input means adapted to move the first member of the motion sensor for relative movements between the first and second members of less than the predetermined value, output means connected to the second member of the motion sensor and operative upon introduction of the signal generated by the sensor to move the second member in a direction to minimize the relative displacement between the first and second members, means operative upon a relative displacement of the predetermined value between the first and second members of the motion sensor to free the first member from movement with the input means, and means operative upon a reduction in the relative displacement between the first and second members to that within the predetermined value to couple the first member to the input means for a movement of the first member with the input means.

12. In combination, a motion sensor including first and second members movable relative to each other to generate a signal, input means, latching means adapted to move the first member of the motion sensor and adapted to be driven by the input means for relative movements between the first and second members of the motion sensor of a predetermined magnitude within the signal generating limits of the sensor, output means operative upon introduction of the signal generated by the sensor to move the second member of the sensor in a direction to minimize the relative displacement between the first and second members, means for disengaging the latching means upon a relative displacement of the predetermined magnitude between the first and second members of the motion sensor to uncouple the input means and the first member in the motion sensor, and means for re-engaging the latching means upon a reduction in the relative displacement between the first and second members of the motion sensor to a magnitude less than the predetermined value to produce a movement of the first member in the motion sensor with the input means.

13. In combination, a motion sensor including first and second members movable relative to each other within predetermined limits to generate an operable signal, a housing for supporting the first member of the motion sensor, a bell crank lever having a recess portion and pivotably supported on the housing, tension means connected between the bell crank lever and the housing to maintain the lever in an operative position, input means, detent means on the input means and positioned within the recess portion of the bell crank lever for relative movements of less than the predetermined value between the first and second members of the motion sensor, output means connected to the second member of the motion sensor and operative upon introduction of the signal generated by the sensor to move the second member in a direction to minimize the relative displacement between the first and second members, means for producing a pivotal movement of the bell crank lever, upon a relative displacement of the predetermined value between the first and second members of the motion sensor, to free the detent means from the recess portion of the lever, and means for pivoting the bell crank lever into an engagement between the recess portion and the detent means upon a reduction of the relative displacement between the first and second members of the motion sensor to a magnitude within the predetermined value.

14. In combination, a bell crank lever having a recess portion, an input rod, a disc connected to the input rod and positioned within the recess portion of the bell crank lever for movement of the lever in accordance with the movements of the input rod, a motion sensor including first and second members movable relative to each other through a first range from a null position to generate a signal having an amplitude proportional to the relative movement, a housing for supporting the first member of the motion sensor and adapted to move with the input rod for relative movements between the first and second members of the motion sensor of a predetermined magnitude greater than the first range and within the signal-generating limits of the sensor, output means connected to the second member of the motion sensor and operative upon introduction of the signal generated by the sensor to move the second member in a direction to minimize the relative displacement between the first and second members, means operative upon a relative displacement of the predetermined magnitude between the first and second members of the motion sensor to free the disc from the recess portion of the bell crank lever, and means operative upon a reduction in the relative displacement between the first and second members to a magnitude within the predetermined value to position the disc within the recess portion of the bell crank lever.

15. In combination, a bell crank lever having a recess portion, an input rod, a disc attached to the input rod and positioned within the recess portion of the bell crank lever for movement of the lever in accordance with the movements of the input rod, a motion sensor including first and second members movable relative to each other through a first range from a null position to generate a signal having an amplitude proportional to the relative movement, a housing for supporting the bell crank lever and the first member of the motion sensor and adapted to move with the input rod for relative movements between the first and second members of the sensor of a predetermined magnitude greater than the first range and within the signal generating limits of the sensor, output means connected to the second member of the motion sensor and operative upon introduction of the signal to move the second member in a direction to minimize the relative displacement between the first and second members, a lug connected to the output means, means on the output means for engaging the housing upon a relative displacement of the predetermined magnitude between the first and second members of the motion sensor to free the disc from the recess portion of the lever and to dispose the lever against the lug, and means operative upon a reduction in the relative displacement between the first and second members to a magnitude within the predetermined value to position the disc within the recess portion of the lever and to free the lever from engagement with the lug.

References Cited in the file of this patent

UNITED STATES PATENTS

| Number | Name | Date |
|---|---|---|
| 2,357,790 | Turchan et al. | Sept. 5, 1944 |
| 2,373,332 | O'Neill | Apr. 10, 1945 |
| 2,437,603 | Hornfeck | Mar. 9, 1948 |
| 2,533,040 | Petrak | Dec. 5, 1950 |